United States Patent
Gruenfeld

[15] 3,676,456
[45] July 11, 1972

[54] DERIVATIVES OF 3-ARYL-5-ALKYLHYDANTOINS

[72] Inventor: Norbert Gruenfeld, Bronx, N.Y.

[73] Assignee: Ciba-Geigy Corporation

[22] Filed: Feb. 27, 1970

[21] Appl. No.: 15,208

Related U.S. Application Data

[63] Continuation-in-part of Ser. No. 717,035, March 28, 1968, abandoned.

[52] U.S. Cl. .................260/309.5, 424/273, 260/515 A, 260/515 R, 260/521 R
[51] Int. Cl. .............................................C07d 49/32
[58] Field of Search................................260/309.5

[56] References Cited

UNITED STATES PATENTS

| | | | |
|---|---|---|---|
| 3,134,663 | 5/1964 | Kroll | 260/309.5 |
| 2,075,359 | 3/1937 | Salzberg | 424/250 |

OTHER PUBLICATIONS

Chem. Abstracts, Vol. 60: 14512 f June 1964, Imperial Chemical Industries, Ltd.

*Primary Examiner*—Henry R. Jiles
*Assistant Examiner*—S. D. Winters
*Attorney*—Karl F. Jorda and Bruce M. Collins

[57] ABSTRACT

3-Phenyl-5-alkylhydantoins and certain derivatives thereof are anti-inflammatory, analgesic and antipyretic agents and are prepared through cyclization of a phenylhydantoic acid or ester. A typical embodiment is 3-(p-fluorophenyl)-5-methyl-hydantoin.

6 Claims, No Drawings

DERIVATIVES OF 3-ARYL-5-ALKYLHYDANTOINS

CROSS REFERENCE

This is a continuation-in-part of Ser. No. 717,035 filed Mar. 28, 1968, now abandoned.

DETAILED DISCLOSURE

The present invention pertains to certain novel derivatives of 3-phenyl-5-alkylhydantoins, in particular to compounds of this class which have the structural formula:

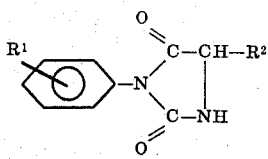

in which
$R^1$ is (lower)alkoxy, fluoro or trifluoromethyl and
$R^2$ is (lower)alkyl.

The present invention also pertains to the use of these and other 3-phenyl-5-alkylhydantoins as antiinflammatory, analgesic and antipyretic agents and to pharmaceutical compositions in unit dosage form adapted for realization of these utilities.

Throughout this specification and the claims, the term "(lower)alkyl" denotes a branched or straight monovalent hydrocarbon group of from one to four carbon atoms such as methyl, ethyl, propyl, isopropyl and the like, preferably the lowest member, methyl. Similarly the term "(lower)alkoxy" denotes ether derivations of such (lower)alkyl groups, such as methoxy, ethoxy, propyloxy and the like, the preferred species again being the lowest member, methoxy.

The present method of treating inflammatory conditions, pain and fever in animals comprises the oral administration to the animal of an effective amount of a compound of the formula:

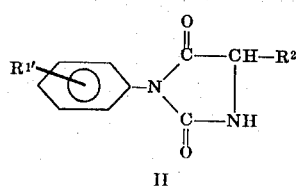

in which
$R^{1'}$ is (lower)alkoxy, fluoro, trifluoromethyl, chloro, hydrogen or (lower)alkyl and
$R^2$ is (lower)alkyl.

The present invention also provides pharmaceutical compositions for the practice of this method. These compositions provide a unit dosage of a compound of Formula II in combination with a pharmaceutical carrier, the amount being sufficient to effect an anti-inflammatory, analgesic and/or antipyretic response upon a single or multiple dose regimen.

The 3-phenyl-5-alkylhydantoins of Formulas I and II can be prepared synthetically through initial condensation of an amino acid or an alkyl ester thereof of Formula III, generally as an acid addition salt, and a phenylisocyanate of Formula IV and cyclization of the resulting phenylhydantoic acid or ester thereof.

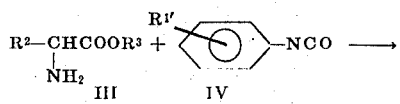

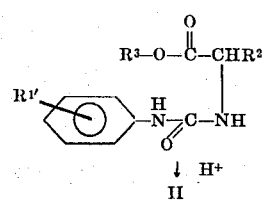

wherein
$R^{1'}$ and $R^2$ are as defined above and
$R^3$ is hydrogen or (lower)alkyl.

Thus for example, equimolar amounts of D-, L-, or D,L-alanine methyl ester, an appropriately substituted phenylisocyanate and a base such as sodium bicarbonate are heated in the presence of an inert nonaqueous solvent such as benzene. The resulting methyl phenylhydantoate, alternatively named as $N_1$-phenyl-$N_3$-(2-propionic acid methyl ester)urea, is isolated, preliminarily purified, hydrolyzed with acid or base, and then cyclized in the presence of a mineral acid. The product is isolated by simple filtration and purified through conventional methods such as recrystallization.

The 3-phenyl-5-alkylhydantoins of the present invention exist as optical isomers and both the racemates and the individual isomers are within the scope of the present invention. While the racemate is generally employed, the individual isomers can be obtained through use of the corresponding optical isomer of the amino acid starting material.

The 3-phenyl-5-alkylhydantoins of Formula II are useful for the treatment of inflammatory conditions such as dermatitis, inflammation of joints and similar conditions which are usually responsive to known antiinflammatory agents. They are also useful in the treatment of pain and in reducing hypernormal body temperatures. They are well tolerated and do not appear to cause undesirable side effects such as allergic reactions. A particularly preferred compound is 3-(p-fluorophenyl)-5-methylhydantoin.

Administration is effected via the oral route. For this purpose, a 3-phenyl-5-alkylhydantoin of Formula II is incorporated in compositions suitable for oral administration to animals in solid and liquid unit dosage forms, such as tablets, capsules, powders, granules, syrups, elixirs and the like. The term unit dosage form as used in this specification and claims refers to physically discrete units suitable as unitary dosages for animals, each unit containing a predetermined quantity of active material calculated to produce the desired effect in association with the required pharmaceutical diluent, carrier or vehicle.

Powders are prepared by comminuting a 3-phenyl-5-alkylhydantoin of Formula II to a suitable fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like, is wetted with a binder such as acacia mucilage, gelatin solution, methylcellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into slugs. The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating of carbauba wax may be provided.

Oral fluids are prepared in unit dosage forms such as syrups and elixirs wherein each teaspoonful of composition contains a predetermined amount of the compound for administration.

The pharmacological properties of the 3-phenyl-5-alkylhydantoin of Formula II can be conveniently observed in standard and accepted tests, which are recognized by pharmacologists as correlating to a specific therapeutic response. For example, antiinflammatory activity can be readily observed in the anticarrageenin study, which is generally performed in the rat and in other conventional tests using other species. Antipyretic effects can be observed in rats fevered by Brewer's yeast as well as in canines fevered by vaccine. Thus in the latter test, a highly significant antipyretic effect is observed at a dose of 200 mg/kg.

In terms of analgesic effect, the compounds are comparable to aspirin. The antiinflammatory, analgesic and antipyretic activities of the 3-phenyl-5-alkylhydantoins of Formula II are all observed in a dosage range of from about 5 to about 500 mg/kg of body weight; preferably from about 10 to about 250 mg/kg, the precise dosage depending upon the nature, age and size of the species, the particular indication involved and the response observed.

The following examples will serve to further typify the nature of this invention but should not be construed as a limitation thereof.

EXAMPLE 1 p-Fluorophenylisocyanate (0.12 mole, 16.48 g) is added to a suspension of D,L-alanine methyl ester hydrochloride (0.12 mole, 16.74 g) and sodium bicarbonate (0.12 mole, 10.08 g) in anhydrous benzene (120 ml). The reaction mixture is heated at reflux for 5 hours and then cooled. The reaction mixture is filtered and the collected solid is washed well with water to remove salts and dried; m.p. 155°–68°. A solution of this material, consisting essentially of $N_1$-(p-fluorophenyl)$N_3$-2-propionic acid methyl ester)urea, in 3N hydrochloric acid (150 ml) and ethanol (150 ml) is heated at reflux for 4 hours. The reaction mixture is cooled and the 3-(p-fluorophenyl)-5-methylhydantoin is collected by filtration and further purified through a preliminary recrystallization from ethanol and three recrystallizations from isopropanol with charcoal clarification. The purified material demonstrates a melting point of 183°–186° C. and a $\lambda_{Max}$ of 215 $\mu$ with a shoulder at 260$\mu$. A typical carbonhydrogen analysis is as follows:

| | | | |
|---|---|---|---|
| Calcd. for $C_{10}H_9F_2O_2$: | C, 57.68; | H, 4.36; | N, 13.46; |
| Found: | 57.39; | 4.36; | 13.22. |

EXAMPLE 2

To a suspension of D,L-alanine methyl ester hydrochloride (0.13 mole, 18.09 g) and sodium bicarbonate (0.13 mole, 10.94 g) in anhydrous benzene (130 mole, 19.3 g). This mixture is heated at reflux for 10 hours and then cooled. The product is collected by filtration, washed with water and recrystallized twice from methanol (200 ml) and once from ethanol. This material is dissolved in boiling 6N sodium hydroxide solution (165 ml) and the insoluble material is removed by filtration of the hot solution through a glass sintered funnel. The filtrate is cooled and the sodium salt which precipitates is collected by filtration, washed with 6N sodium hydroxide solution and redissolved in water. This solution is adjusted to pH 4 with 50 percent acetic acid and 5-)p-methoxyphenyl)-2-methylhydantoic acid, m.p. 176°–177° C. precipitates. A suspension of this acid in ethanol (110 ml) and 1N hydrochloric acid (110 ml) is heated at reflux for four hours and cooled to yield the product, 3-(p-p-methoxyphenyl)-5-methylhydantoin, which after one recrystallization from ethanol melts at 179°–180° C. The following is a typical analysis:

| | | | |
|---|---|---|---|
| Calcd. for $C_{11}H_{12}N_2O_3$: | C, 59.99; | H, 5.49; | N, 12.72; |
| Found: | 59.74; | 5.52; | 12.67 |

EXAMPLE 3 m-Trifluoromethylphenylisocyanate (0.09 mole, 16.8 g), in D,L-alanine methyl ester hydrochloride (0.09 mole, 12.4 g), and sodium bicarbonate (0.09 mole, 7.56 g) in anhydrous benzene (90 ml) is heated at reflux for 5 hours and cooled. The reaction mixture is filtered and the collected solid is washed with water. The mother liquor is evaporated to dryness and the residue is dissolved in chloroform and water. The organic phase is separated, dried over sodium sulfate and evaporated to dryness to yield $N_1$-(m-trifluoromethylphenyl $N_3$-(2-propionic acid methyl ester)urea as an oil.

A solution of this oil is 3N hydrochloric acid (112.5 ml) is heated at reflux for 4 hours and then cooled. The product is collected by filtration and the mother liquor is refiltered to give a second crop. The combined solid is suspended in ether and stirred at room temperature and filtered. 3-(m-Trifluoromethylphenyl)-5-methylhydantoin, m.p. 135°–137° C., is thus collected and further purified through recrystallization from benzene. A typical analysis is as follows:

| | | | | |
|---|---|---|---|---|
| Calcd for $C_{11}H_9F_3N_2O_2$: | C, 51.17; | H, 3.52; | N, 10.85; | F, 22.07; |
| Found: | 50.99; | 3.55; | 10.78; | 22.17 |

In a similar fashion utilizing p-trifluoromethylphenylisocyanate there is obtained 3-(p-trifluoromethylphenyl)-5-methylhydantoin, m.p. 180°–181° C.

EXAMPLE 4

In a similar fashion to that described in Example 1 but utilizing each of phenylisocyanate, p-chlorophenylisocyanate and p-methylisocyanate, there are respectively obtained 3-phenyl-5-methylhydantoin, m.p. 170°–170.5° C.; 3-(p-chlorophenyl)-5-methylhydantoin, m.p. 170°–171° C. and 3-(p-methylphenyl)-5-methylhydantoin, m.p. 165°–166° C.

EXAMPLE 5 p-Fluorophenylisocyanate (0.1685 mole, 23.05 g) is added dropwise over a 10 minute period to a mixture of L-alanine (0.1685 mole, 15 g) and potassium hydroxide (0.1685 mole, 9.44 g) in water (143.2 ml) at 5° to 10° C. The mixture is stirred with cooling at 5° to 10° C. for 3 hours and filtered. The filtrate is cooled and rendered acidic (pH 1–2) with concentrated hydrochloric acid. Water (83.2 ml) and isopropanol (33.7 ml) are added and the mixture is heated at 95° C. for 2 hours, cooled and filtered. The crude product is dissolved in chloroform (1,000 ml), washed with saturated sodium bicarbonate solution and then with water. The chloroform solution is dried over sodium sulfate and evaporated to dryness to yield L-3-(p-fluorophenyl)-5-methylhydantoin, m.p. 134°–136° C., which is recrystallized from isopropanol, m.p. 139°–140°C. Optical rotation (1 percent methanol solution at 25°C.)

| $\alpha$ D | observed rotation | wave length |
|---|---|---|
| −38.8°−0.388° | | 589 m$\mu$ |
| −40.8°−0.408° | | 578 |
| −46.4°−0.464° | | 546 |
| −80.8°−0.808° | | 436 |
| −132.4°−1.324° | | 365 |

Utilizing D-alanine in place of L-alanine, there is obtained D-3-(p-fluorophenyl)-5-methylhydantoin, m.p. 139°–140°C. Optical Rotation (1 percent methanol solution at 25°C.)

| $\alpha$ D | observed rotation | wave length |
|---|---|---|
| 39.5°0.395° | | 589 m$\mu$ |
| 40.9°0.409° | | 578 |
| 46.9°0.469° | | 549 |
| 82.1°0.821° | | 436 |
| 135.0°1.350° | | 365 |

EXAMPLE 6 p-Fluorophenylisocyanate (0.11 mole, 15.3 g) is added to D,L norleucine methyl ester hydrochloride (0.11 mole, 20 g) and sodium bicarbonate (0.11 mole, 9.24 g) in anhydrous benzene (110 ml). The mixture is heated at reflux for 5 hours, cooled and filtered, the solid being washed with benzene. The filtrate is evaporated to dryness and the residue is combined with the solid and heated at reflux for 4 hours in 3N hydrochloric acid (110 ml) and 2B ethanol (110 ml). The solution is cooled and filtered and the product is washed with water and dissolved in chloroform (220 ml). This solution is washed with saturated sodium bicarbonate solution, dried over sodium sulfate and evaporated to dryness to give 3-(p-fluorophenyl)-5-butyl-hydantoin, m.p. 134°–136° C. which is recrystallized from isopropanol (75 ml), m.p. 134°–136° C.

EXAMPLE 7

| Ingredient | Quantity/capsule |
|---|---|
| 3-(p-Chlorophenyl)-5-methylhydantoin | 100 mg |
| Corn Starch U.S.P. | 200 mg |

The foregoing ingredients are mixed and introduced into a two piece No. 1 hard gelatin capsule.

A similar formulation is employed for a capsule composition utilizing 3-(p-fluorophenyl)-5-methylhydantoin.

EXAMPLE 8

| Ingredient | Quantity/tablet |
|---|---|
| 3-(p-methylphenyl)-5-methylhydantoin | 50 mg |
| Corn starch U.S.P. | 130 mg |
| Lactose | 160 mg |
| Cab-O-Sil M-5 | 4 mg |
| Gelatin U.S.P. | 5 mg |
| Magnesium Stearate U.S.P. | 1 mg |

The foregoing ingredients are thoroughly mixed and pressed into tablets suitable for oral administration of 50 mg of active ingredient. The tablets may be scored to permit administration of fractional doses.

EXAMPLE 9

| Ingredient | Quantity/tablet |
|---|---|
| 3-(p-Methoxyphenyl)-5-methylhydantoin | 250 mg |
| Lactose | 80 mg |
| Corn Starch | 70 mg |
| Soluble starch | 15 mg |
| Magnesium stearate | 5 mg |

The first three ingredients are thoroughly mixed and granulated with a solution of the soluble starch. This granulate is dried, mixed with the magnesium stearate and pressed into tablet cores which are coated as with sugar.

What is claimed is:

1. A compound of the formula

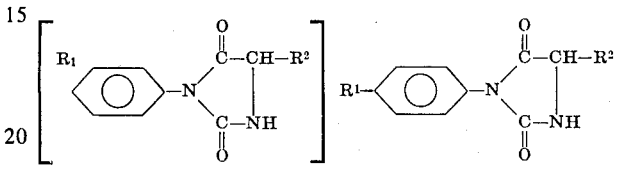

wherein
R$^1$ is (lower)alkoxy, fluoro or trifluoromethyl and
R$^2$ is (lower)alkyl.

2. A compound according to claim 1 where R$^1$ is p-fluoro.

3. A compound according to claim 1 which is 3-(p-fluorophenyl)-5-methylhydantoin.

4. A compound according to claim 1 which is 3-(p-methoxyphenyl)-5-methylhydantoin.

5. A compound according to claim 1 which is 3-(p-trifluoromethylphenyl)-5-methylhydantoin.

6. A compound according to claim 1 which is 3-(p-fluorophenyl)-5-butylhydantoin.

* * * * *